(12) United States Patent
Fujii

(10) Patent No.: US 8,326,623 B2
(45) Date of Patent: Dec. 4, 2012

(54) ELECTRONIC APPARATUS AND DISPLAY PROCESS METHOD

(75) Inventor: Tetsuya Fujii, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1121 days.

(21) Appl. No.: 12/207,352

(22) Filed: Sep. 9, 2008

(65) Prior Publication Data

US 2009/0089056 A1    Apr. 2, 2009

(30) Foreign Application Priority Data

Sep. 27, 2007   (JP) ................................. 2007-251650

(51) Int. Cl.
*G10L 17/00* (2006.01)
*G10L 15/22* (2006.01)

(52) U.S. Cl. ........ 704/246; 704/235; 704/231; 704/270; 715/721

(58) Field of Classification Search .................. 704/246, 704/235, 231; 715/721
See application file for complete search history.

(56) References Cited

U.S. PATENT DOCUMENTS

| | | | | |
|---|---|---|---|---|
| 5,786,814 A | * | 7/1998 | Moran et al. | 715/720 |
| 2002/0083473 A1 | * | 6/2002 | Agnihotri et al. | 725/140 |
| 2003/0018475 A1 | * | 1/2003 | Basu et al. | 704/270 |

FOREIGN PATENT DOCUMENTS

| | | |
|---|---|---|
| JP | 8-153118 | 6/1996 |
| JP | 3634643 | 5/2000 |
| JP | 2000-322450 | 11/2000 |
| JP | 2001-309269 | 11/2001 |
| JP | 2003255979 | 9/2003 |
| JP | 2006-80621 | 3/2006 |

OTHER PUBLICATIONS

Tranter et al. "An Overview of Automatic Speaker Diarization Systems" IEEE Transactions on Audio, Speech, and Language Processing. vol. 14, No. 5, Sep. 2006.*
Japanese Patent Application No. 2007-251650, Final Notice of Rejection, mailed Nov. 15, 2011, (with English Translation).
Japanese Patent Application No. 2007-251650, Notice of Reasons for Rejection, mailed Sep. 6, 2011, (with English Translation).

* cited by examiner

*Primary Examiner* — Vincent P Harper
(74) *Attorney, Agent, or Firm* — Blakely, Sokoloff, Taylor & Zafman LLP

(57) ABSTRACT

According to one embodiment, an electronic apparatus includes a sound characteristic output module configured to analyze audio data in video content data, thereby outputting sound characteristic information indicative of sound characteristics of the audio data. A talk section detection process module detects talk sections in which talks are made by persons, which are included in the video content data, on the basis of the sound characteristic information, and classifies the detected talk sections into a plurality of groups which are associated with different speakers. A display process module displays, on a time bar which is representative of a sequence of the video content data, a plurality of bar areas indicative of positions of the detected talk sections in the sequence of the video content data, in different display modes in association with the groups.

6 Claims, 11 Drawing Sheets

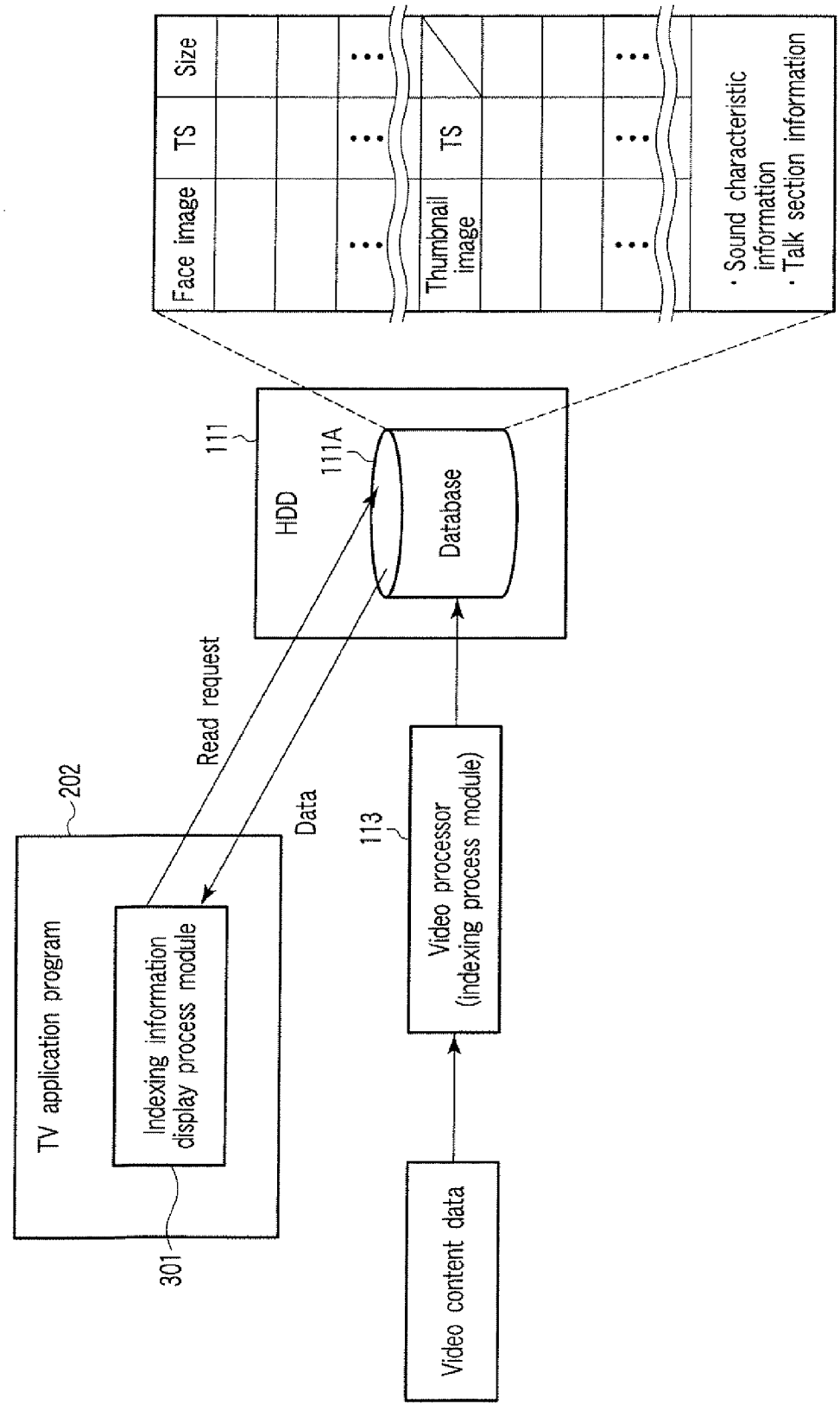
F I G. 3

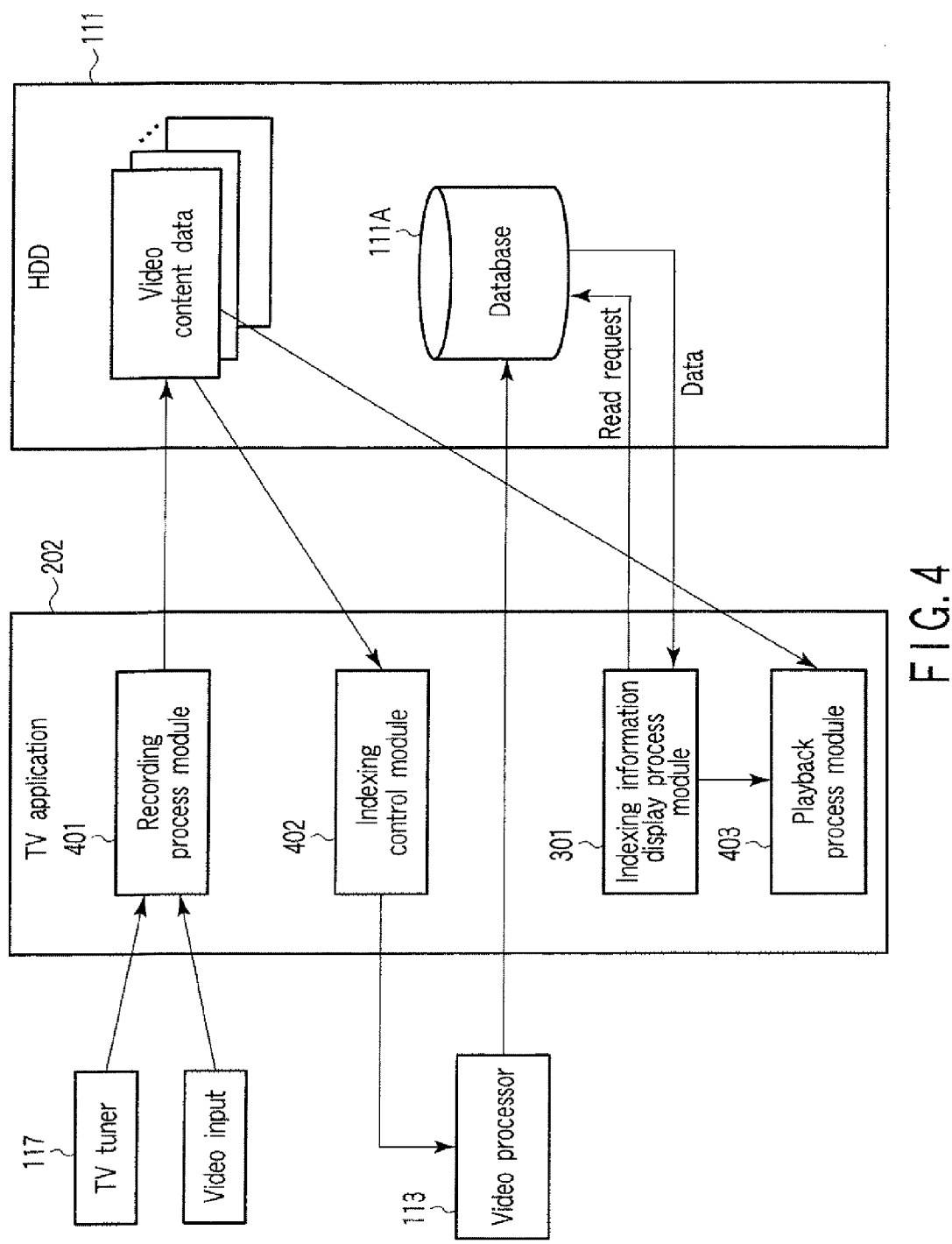
F I G. 4

ELECTRONIC APPARATUS AND DISPLAY PROCESS METHOD

CROSS-REFERENCE TO RELATED APPLICATIONS

This application is based upon and claims the benefit of priority from Japanese Patent Application No. 2007-251650, filed Sep. 27, 2007, the entire contents of which are incorporated herein by reference.

BACKGROUND

1. Field

One embodiment of the present invention relates to an electronic apparatus and a display method for displaying an outline of video content data.

2. Description of the Related Art

In general, an electronic apparatus, such as a video recorder or a personal computer, is capable of recording and playing back various video content data such as TV broadcast program data. In this case, although titles are added to the respective video content data stored in the electronic apparatus, it is difficult for a user to understand, from the title alone, what kind of content each video content data has. In order to understand the content of each video content data, it is thus necessary to play back the video content data. In the case of playing back video content data of a long total time, however, even it a quick forward function or the like is used, a great deal of time is needed.

Jpn. Pat. Appln. KOKAI Publication No. 2001-discloses an apparatus having an appearing person list display function. This apparatus has a function of displaying, in an arranged order, the face images of persons appearing in video content as a list of persons appearing in the video content.

However, with simple display of the list of appearing persons, it is difficult for a user to understand where in video content data, such as broadcast program data, a speech position of a person is present. For example, in some case, the user wishes to search a broadcast program for speech positions of a certain person whom the user is interested in, and to selectively play back only parts corresponding to the speech positions. Therefore, it is necessary to realize a novel function for presenting, to the user, in which time zones of the entire video content data the speech positions of a certain person appear, with the speech positions being classified on a person-by-person basis.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is an exemplary block diagram for describing an indexing information display function of the electronic apparatus according to the embodiment;

FIG. 4 is an exemplary block diagram showing the functional configuration of a program which is used in the electronic apparatus according to the embodiment;

DETAILED DESCRIPTION

Various embodiments according to the invention will be described hereinafter with reference to the accompanying drawings. In general, according to one embodiment of the invention, there is provided an electronic apparatus including: a sound characteristic output module configured to analyze audio data in video content data, thereby outputting sound characteristic information indicative of sound characteristics of the audio data; a talk section detection process module configured to execute a talk section detection process of detecting talk sections in which talks are made by persons, which are included in the video content data, on the basis of the sound characteristic information, and classifying the detected talk sections into a plurality of groups which are associated with different speakers; and a display process module configured to display, on a time bar which is representative of a sequence of the video content data, a plurality of bar areas indicative of positions of the detected talk sections in the sequence of the video content data, in different display modes in association with the groups, on the basis of a result of the talk section detection process.

Figure 1:
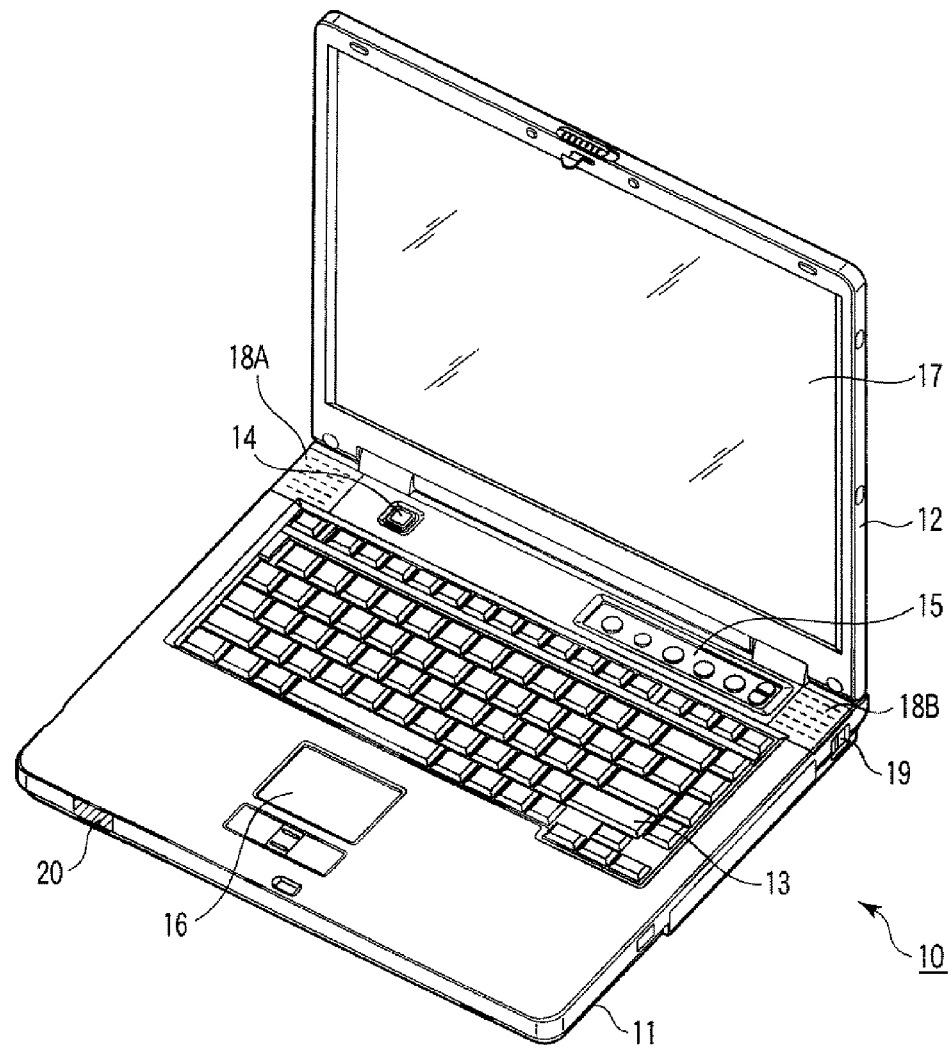
FIG. 1 is an exemplary perspective view showing the external appearance of an electronic apparatus according to an embodiment of the invention.
Figure 2:
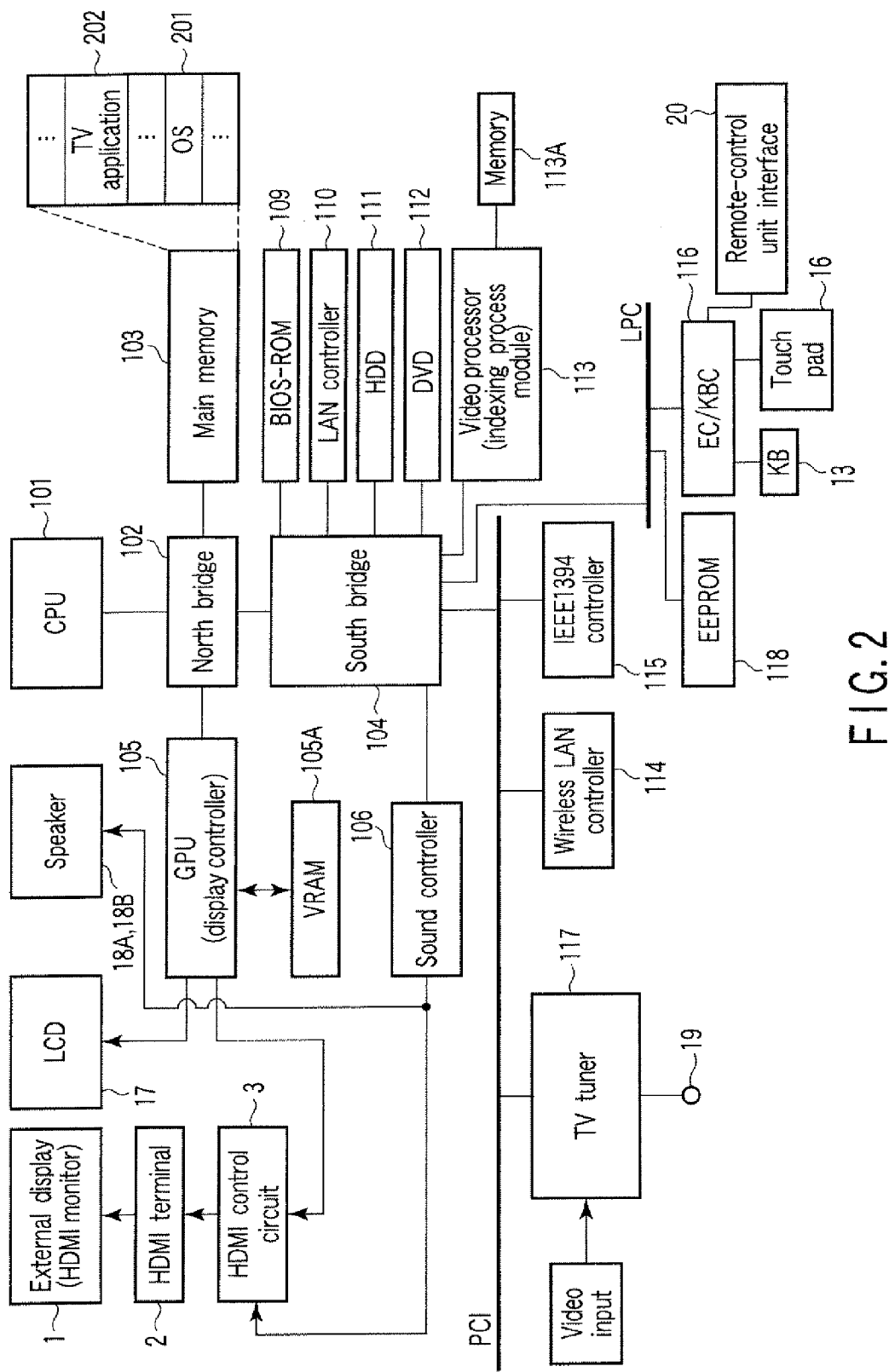
FIG. 2 is an exemplary block diagram showing an example of the system configuration of the electronic apparatus according to the embodiment.

To begin with, referring to FIG. 1 and FIG. 2, the structure of an electronic apparatus according to an embodiment of the invention is described. The electronic apparatus according to this embodiment is realized, for example, by a notebook portable personal computer 10 functioning as an information processing apparatus.

The personal computer 10 is capable of recording and playing back video content data (audio-visual content data) such as broadcast program data and video data which is input from an external device. Specifically, the personal computer 10 has a television (TV) function for executing viewing/listening and recording of broadcast program data which is broadcast by a TV broadcast signal. This TV function is realized, for example, by a TV application program which is preinstalled in the personal computer 10. In addition, the TV function includes a function of recording video data which is input from an external AV device, and a function of playing back recorded video data and recorded broadcast program data.

Further, the personal computer 10 has an indexing information display function which detects positions of talk sections in which talks are made by persons, the talk sections being included in video content data such as video data stored in the personal computer 10 or broadcast program data, and displays, on a display screen, a time bar which indicates positions of talk sections in a sequence of the video content data, by classifying the positions of the talk sections on a speaker-by-speaker basis. This indexing information display function is implemented, for example, as one of functions included in the TV function.

Further, the indexing information display function includes a face image list display function for displaying, for instance, a list of face images of persons who appear in video content data. This face image list display function can present, to the user, which persons appear in which time zones in the whole video content data. In addition, the face image list display function can display, in association with talk sections on the time bar, the face images of persons appearing in the talk sections.

Moreover, the indexing information display function includes a thumbnail image display function of displaying, for instance, a list of still images which are extracted from video content data.

FIG. 1 is a perspective view that shows the state in which a display unit of the computer 10 is opened. The computer 10 comprises a computer main body 11 and a display unit 12. A display device that is composed of a TFT-LCD (Thin Film Transistor Liquid Crystal Display) 17 is built in the display unit 12.

The display unit 12 is attached to the computer main body 11 such that the display unit 12 is freely rotatable between an open position where a top surface of the computer main body 11 is exposed, and a closed position where the top surface of the computer main body 11 is covered. The computer main body 11 has a thin box-shaped casing. A keyboard 13, a power button 14 for powering on/off the computer 10, an input operation panel 15, a touch pad 16 and speakers 18A, 18B are disposed on the top surface of the computer main body 11.

The input operation panel 15 is an input device that inputs an event corresponding to a pressed button. The input operation panel 15 has a plurality of buttons for activating a plurality of functions. The buttons include operation buttons for controlling a TV function (viewing/listening, recording, and playback of recorded broadcast program data/video data). In addition, a remote-control unit interface unit 20, which executes communication with a remote-controls unit that controls the TV function of the computer 10, is provided on a front surface of the computer main body 11. The remote-control interface unit 20 is composed of, e.g. an infrared signal receiving unit.

An antenna terminal 19 for TV broadcast is provided, for example, on a right side surface of the computer main body 11. In addition, on a rear surface of the computer main body 11, there is provided an external display connection terminal corresponding to, e.g. the HDMI (high-definition multimedia interface) standard. The external display connection terminal is used to output video data (moving picture data), which is included in video content data such as broadcast program data, to an external display.

Referring now to FIG. 2, the system configuration of the computer 10 is described.

As shown in FIG. 2, the computer 10 includes a CPU 101, a north bridge 102, a main memory 103, a south bridge 104, a graphics processing unit (GPU) 105, a video memory (VRAM) 105A, a sound controller 106, a BIOS-ROM 109, a LAN controller 110, a hard disk drive (HDD) 111, a DVD drive 112, a video processor 113, a memory 113A, a wireless LAN controller 114, an IEEE 1394 controller 115, an embedded controller/keyboard controller IC (EC/KBC) 116, a TV tuner 117, and an EEPROM 118.

The CPU 101 is a processor which controls the operation of the computer 10. The CPU 101 executes an operating system (OS) 201 and various application programs such as a TV application program 202, which are loaded from the hard disk drive (HOD) 111 into the main memory 103. The TV application program 202 is software for executing the TV function. The TV application program 202 executes, for example, a live playback process for viewing/listening to broadcast program data which is received by the TV tuner 117, a recording process for recording received broadcast program data in the HDD 111, and a playback process for playing back broadcast program data/video data which is recorded in the HDD 111. The CPU 101 also executes a BIOS (Basic Input/Output System) that is stored in the BIOS-ROM 109. The BIOS is a program for hardware control.

The north bridge 102 is a bridge device that connects a local bus of the CPU 101 and the south bridge 104. The north bridge 102 includes a memory controller that access-controls the main memory 103. The north bridge 102 has a function of executing communication with the GPU 105 via, e.g. a PCI EXPRESS serial bus.

The GPU 105 is a display controller for controlling the LCD 17 that is used as a display monitor of the computer 10. A display signal, which is generated by the GPU 105, is sent to the LCD 17. In addition, the GPU 105 can send a digital video signal to an external display device 1 via an HDMI control circuit 3 and an HDMI terminal 2.

The HDMI terminal 2 is the above-mentioned external display connection terminal. The HDMI terminal 2 can send both a non-compressed digital video signal and a digital audio signal via a single cable to the external display device 1 such as a TV. The HDMI control circuit 3 is an interface for sending the digital video signal to the external display device 1, which is called "HDMI monitor", via the HDMI terminal 2.

The south bridge 104 controls the devices on an LPC (Low Pin Count) bus, and the devices on a PCI (Peripheral Component Interconnect) bus. In addition, the south bridge 104 includes an IDE (Integrated Drive Electronics) controller for controlling the hard disk drive (HDD) 111 and DVD drive 112. The south bridge 104 also includes a function of executing communication with the sound controller 106.

Further, the video processor 113 is connected to the south bridge 104 via, e.g. a PCI EXPRESS serial bus.

The video processor 113 is a processor which executes an audio indexing process and a video indexing process.

The audio indexing process is an indexing process of analyzing audio data which is included in video content data, thereby detecting, on the basis of sound characteristics of the audio data, a talk section in which a talk is made by a person, which is included in the video content data. In the audio indexing process, audio data is first analyzed, and thereby sound characteristic information, which is indicative of sound characteristics such as a frequency spectrum of audio data, is generated. This is followed by executing a talk section detection process of analyzing the sound characteristics, detecting talk sections in which talks are made by persons, which are included in the video content data, and classifying the detected talk sections into a plurality of groups associated with different speakers. In the talk section detection process, a speaker segmentation technique or a speaker clustering technique, for instance, is used. Thereby, a change of speakers is also detected. Basically, a period in which the same speaker talks continuously becomes one talk section. Besides, in the talk section detection process, a talk section, in which a plurality of speakers talk at the same time, can be detected as a talk section distinguished from a talk section in which a single person talks.

Furthermore, the audio indexing process executes a cheer level detection process of detecting a cheer level in each partial data (data of a fixed time length) in video content data, and an excitement level detection Process of detecting an excitement level in each partial data in video content data.

The cheer level is indicative of a magnitude of cheer. Cheer is a sound in which voices of many people are combined. The sound in which voices of many people are combined has a distribution of a specific frequency spectrum. In the cheer level detection process, the frequency spectrum of audio data included in video content data is analyzed, and a cheer level of each partial data is detected in accordance with an analysis result of the frequency spectrum. The excitement level is a volume level of a section in which a volume level of a certain fixed level or more occurs continuously for a predetermined time length or more. For instance, a volume level of a sound, such as relatively great applause or loud laugh, is the excitement level. In the excitement level detection process, the distribution of the volume of audio data included in video content data is analyzed, and the excitement level of each partial data is detected in accordance with the analysis result.

In the video indexing process, a face image extraction process is executed. In the face image extraction process, the video processor 113 extracts a plurality of face images from moving picture data which is included in video content data. The extraction of face images is executed, for example, by a face detection process for detecting a face region from each frame of the moving picture data, and a cut-out process (trimming process) for cutting out the detected face region from the frame. The detection of the face region can be executed, for example, by analyzing the characteristics of the image of each frame and searching for a region having characteristics similar to those of a pre-prepared face image characteristic sample. The face image characteristic sample is characteristic data which is obtained by statistically processing face image characteristics of many persons.

In the video indexing process, a thumbnail image acquisition process is also executed. In the thumbnail image acquisition process, the video processor 113 extracts a still image of at least one frame from each of a plurality of sections which constitute a sequence of video content data. The time length of each of the sections is, for example, equal. In this case, the video processor 113 extracts a still image of at least one frame at equal time intervals from moving picture data that is included in the video content data. Needless to say, the time length of each of the sections may not necessarily be equal. For example, if the moving picture data included in the video content data is compression-encoded, only I (intra) pictures, which are intra-frame encoded pictures, may be extracted from the compression-encoded moving picture data. The video processor 113 may also detect each cut or each scene of the moving picture data in the video content data as each section, and may extract a still image of at least one frame from each detected cut or scene.

The memory 113A is used as a working memory of the video processor 113. A great deal of arithmetic operations is required for executing the indexing process (video indexing process and audio indexing process). In the present embodiment, the video processor 113, which is a dedicated processor and differs from the CPU 101, is used as a back-end processor, and the video processor 113 executes the indexing process. Therefore, the indexing process can be executed without increasing the load on the CPU 101.

The sound controller 106 is a sound source device, and outputs audio data, which is to be played back, to the speakers 18A, 18B or to the HDMI control circuit 3.

The wireless LAN controller 114 is a wireless communication device which executes wireless communication of, e.g. IEEE 802.11 standard. The IEEE 1394 controller 115 executes communication with an external device via an IEEE 1394 serial bus.

The embedded controller/keyboard controller IC (EC/KBC) 116 is a 1-chip microcomputer in which an embedded controller for power management and a keyboard controller for controlling the keyboard (KB) 13 and touch pad 16 are integrated. The embedded controller/keyboard controller IC (EC/KBC) 116 has a function of powering on/off the computer 10 in response to the user's operation of the power button 14. Further, the embedded controller/keyboard controller IC (EC/KBC) 116 has a function of executing communication with the remote-control unit interface 20.

The TV tuner 117 is a receiving device which receives broadcast program data that is broadcast by a television (TV) broadcast signal, and is connected to the antenna terminal 19. For example, the TV tuner 117 is realized as a digital TV tuner which can receive digital broadcast program data such as ground digital TV broadcast program data. The TV tuner 117 also has a function of capturing video data which is input from an external device.

Next, referring to FIG. 3, a description is given of the indexing information display function according to the present embodiment.

The indexing process (video indexing process and audio indexing process) for video content data such as broadcast program data is executed by the video processor 113 that functions as the indexing process module.

Under the control of the TV application program 202, the video processor 113 executes the indexing process, for example, on video content data, such as recorded broadcast program data, which is designated by the user. In addition, the video processor 113 can execute, in parallel with the recording process for storing in the HDD 111 broadcast program data which is received by the TV tuner 117, the indexing process on this broadcast program data.

In the video indexing process, the video processor 113 executes a process of extracting face images. The video processor 113 analyzes, in units of a frame, moving picture data that is included in video content data. The video processor 113 extracts face images of persons from a plurality of frames which constitute moving picture data, and outputs time stamp information TS indicating time points at which the extracted face images appear in the video content data.

Further, the video processor 113 outputs a size (resolution) of each of the extracted face images. The face detection result data (face image, time stamp information TS, and size), which is output from the video processor 113, is stored in the database 111A as face image indexing information. The database 111A is a memory area which is provided in the HDD 111 for storing indexing data.

In addition, in the video indexing process, the video processor 113 executes a thumbnail image acquisition process. A thumbnail image is a still image (a reduced image) corresponding to each of a plurality of frames which are extracted from a plurality of sections which constitute moving picture data in video content data. Specifically, the video processor 113 extracts one or more frames from each of the sections of the moving picture data, and outputs images (thumbnail images) corresponding to the extracted frames and time stamp information TS indicative of time points at which the thumbnail images appear. The thumbnail image acquisition result data (thumbnails, time stamp information TS), which is output from the video processor 113, is also stored in the database 11A as thumbnail indexing data.

As the time stamp information corresponding to each thumbnail image, use may be made of, for instance, an elapsed time from the start of video content data to the appearance of the frame of the thumbnail image, or the frame number of the frame of the thumbnail image.

In the audio indexing process, the video processor 113 analyzes audio data which is included in the video content data, and outputs sound characteristic information, which is indicative of sound characteristics of the audio data, in units of a predetermined time. Specifically, in the audio indexing process, in units of a partial data corresponding to a predetermined time, which constitutes audio data, sound characteristics are extracted from each partial data. The video processor 113 analyzes the sound characteristics of each partial data, thereby executing the talk section detection process. In the talk section detection process, detection of talk sections and a process of classifying the talk sections on a speaker-by-speaker basis are executed. The detection of the talk section can be executed, for example, by comparing the sound characteristics of each partial data with a pre-prepared speech characteristic model. The speech characteristic model is characteristic data which is obtained by statistically processing sound characteristics of many persons.

The process of classifying the talk sections on a speaker-by-speaker basis can be executed, for example, by comparing sound characteristics between partial data having sound characteristics which are similar to the pre-prepared speed characteristic model, that is, between partial data having sound characteristics at a time of speaking by a person, and specifying partial data having the same sound characteristics.

In addition, the process of classifying the talk sections on a speaker-by-speaker basis can also be executed by the procedure of (1) comparing sound characteristics between partial data having sound characteristics at a time of speaking by a person, and generating a plurality of sound characteristic models which are indicative of sound characteristics of a plurality of speakers appearing in video content data, and then (2) calculating the degree of agreement between the sound characteristics of the audio data and the plural sound characteristic models in units of a predetermined time corresponding to partial data.

The database 111A stores the sound characteristic information corresponding to each partial data, and talk section information. The talk section information is the information that is obtained by the talk section detection process. For example, the talk section detection information includes information indicative of a start time point and an end time point of each talk section, and information indicative of a classification result of talk sections on a speaker-by-speaker basis.

Further, in the audio indexing process, the video processor 113 executes the above-described cheer level detection process and the excitement level detection process. The result of the cheer level detection process and the result of the excitement level detection process are also stored in the database 111A as level information.

The TV application program 202 includes an indexing information display process module 301 for executing the above-described indexing information display function. The indexing information display process module 301 is realized, for example, as an indexing viewer program, and displays an indexing view screen for displaying an outline of video content data, by using indexing information (e.g. face image indexing information, thumbnail indexing information, sound characteristic information and talk section information) stored in the database 111A.

Specifically, the indexing information display process module 301 reads out the talk section information from the database 111A, and displays, on the indexing view screen, a time bar which represents a time sequence from a start position to an end position of the video content data, on the basis of the talk section information. On the time bar, a plurality of bar areas, which indicate positions of talk sections in the sequence from the start position to the end position of the video content data, are displayed in different display modes corresponding to individual speakers. For example, the plural bar areas are displayed in different colors corresponding to individual speakers. In this case, bar areas corresponding to talk sections in which talks are made by the same speaker are displayed in the same color. Thereby, for example, in the case where speech positions of the same person are present at a plurality of positions in a broadcast program, such speech positions can be displayed in the same color. In addition, in the case where there is a speech position of another person in the broadcast program, this speech position is displayed in a different color. Therefore, it becomes possible to present, to the user, in which time zones of the video content data the speech positions of the same person are present, with the speech positions being classified on a person-by-person basis.

In the meantime, instead of varying the color from speaker to speaker, the pattern or shape of the bar area may be varied from speaker to speaker.

The above-described talk section detection process for generating the talk section information may be executed not by the video processor 113, but by the indexing information display process module 301. In this case, the indexing information display process module 301 reads out the sound characteristic information from the database 111A, and executes the talk section detection process in accordance with the sound characteristic information. In addition, the video processor 113 can extract only sound characteristics at a time of speaking by persons in units of partial data, and can output sound characteristic information indicative of these sound characteristics. In this case, the indexing information display process module 301 can execute the talk section detection process, simply by executing a process of comparing sound characteristic information between partial data.

In addition, the indexing information display process module 301 reads out the cheer level information and excitement level information from the database 111A, and displays, on the basis of the cheer level information and excitement level information, graphs which indicate a variation in cheer level and a variation in excitement level in the sequence from the start position to the end position of the video content data, on the level display area on the indexing view screen.

By displaying this level display area, it becomes possible to present, to the user, in which part of the video content data a section in which loud cheer occurs is present, and in which part of the video content data a section in which great excitement occurs is present.

The indexing information display process module 301 reads out the face image indexing information (face images, time stamp information TS, and size) from the database 111A, and displays, with use of the face image indexing information, a list of face images of persons, who appear in the video content data, on a two-dimensional display area (hereinafter referred to as "face thumbnail display area") on the indexing view screen.

In this case, the indexing information display process module 301 divides a total time length of video content data into a plurality of time zones, for example, at equal time intervals, and selects a predetermined number of face images appearing in each time zone from the extracted face images. The indexing information display process module 301 arranges and displays the selected predetermined number of face images, in units of a time zone.

Specifically, the two-dimensional face thumbnail display area includes a plurality of face image display areas which are arranged in a matrix including a plurality of rows and a plurality of columns. A plurality of time zones, which constitute the total time length of the video content data, are allocated to the plural columns, respectively. To be more specific, for instance, a plurality of time zones each having the same time length, which are obtained by dividing the total time length of the video content data at equal intervals by the number of these columns, are allocated to the plurality of columns. Needless to say, the time zone allocated to each column may not necessarily have the same time length.

On the basis of the time stamp information TS corresponding to each face image, the indexing information display process module 301 displays face images, which belong to the time zone allocated to each column, on the same number of face image display areas as the number of rows belonging to each column, for example, by arranging the face images in the order of frequency of appearance of face images (in the order of detection time length of face images). In this case, for example, the same number of face images as the number of rows are selected, in the order of frequency of appearance, from the face images belonging to the time zone allocated to each column, and the selected face images are arranged from above to below in the order of frequency of appearance. Needless to say, the face images appearing in the time zone allocated to each column may be displayed, not in the order of frequency of appearance, but in the order of appearance of face images.

The face thumbnail display area is displayed on one of an upper side and a lower side of the time bar.

By this face image list display function, it becomes possible to easily understandably present, to the user, which persons appear in which time zones in the whole video content data. In addition, by the combination of the face thumbnail display area and the time bar, the user can recognize a person, who appears in each talk section, by the face image. Specific structure examples of the face thumbnail display area will be described later with reference to FIG. 11 and the following Figures.

In addition, the indexing information display process module 301 reads out the thumbnail indexing information (thumbnails, time stamp information TS) from the database 111A, and displays, with use of the thumbnail indexing information, the thumbnail images on a thumbnail display area (hereinafter referred to as "bellows thumbnail display area") which is disposed on one of an upper side and a lower side of the face thumbnail display area, by arranging the thumbnail images in line in the order of time of appearance.

Depending on video content data, there is a time zone in which no face image appears. Thus, by displaying the bellows thumbnail display area as well as the face thumbnail display area on the indexing view screen, it is possible to present to the user the content of video content data in the time zone in which no face image appears.

Next, referring to FIG. 4, the functional configuration of the TV application program 202, which operates in cooperation with the indexing viewer program, is described.

The TV application program 202 includes, in addition to the above-described indexing information display process module 301, a recording process module 401, an indexing control module 402, and a playback process module 403. The indexing information display process module 301 and indexing control module 402 can be realized by the indexing viewer program.

The recording process module 401 executes a recording process for recording in the HDD 111 broadcast program data which is received by the TV tuner 117 or video data which is input from an external device. In addition, the recording process module 401 executes a programmed-recording process for receiving, with use of the tuner 117, broadcast program data which is designated by programmed-recording information (channel number, date/time) that is preset by the user, and recording the received broadcast program data in the HDD 111.

The indexing control module 402 controls the video processor (indexing process module) 113 and causes the video processor 113 to execute the indexing process (video indexing process, audio indexing process). The user can designate whether the indexing process is to be executed or not, in association with each broadcast program data that is to be recorded. For example, as regards broadcast program data to be recorded, for which execution of the indexing process has been instructed, the indexing process is automatically started after the broadcast program data is recorded in the HDD 111. Besides, the user may designate video content data, from among the video content data already stored in the HDD 111, for which the indexing process is to be executed.

The playback process module 403 executes a process for playing back each video content data, which is stored in the HDD 111, on a screen (window) which is different from the indexing view screen. In addition, the playback process module 403 has such a function that when a playback instruction event is input by a user operation in the state in which one of face images in the face image list of certain video content data is selected, the playback process module 403 starts playback of the video content data from a time point that is a predetermined time before a time point at which the selected face image appears.

The indexing process may not necessarily be executed by the video processor 113. For example, the TV application program 202 may be provided with a function of executing the indexing process. In this case, the indexing process is executed by the CPU 101 under the control of the indexing viewer program or the TV application program 202.

Next, referring to FIG. 5 to FIG. 11, examples of the indexing view screen are described.

Figures 5, 6:
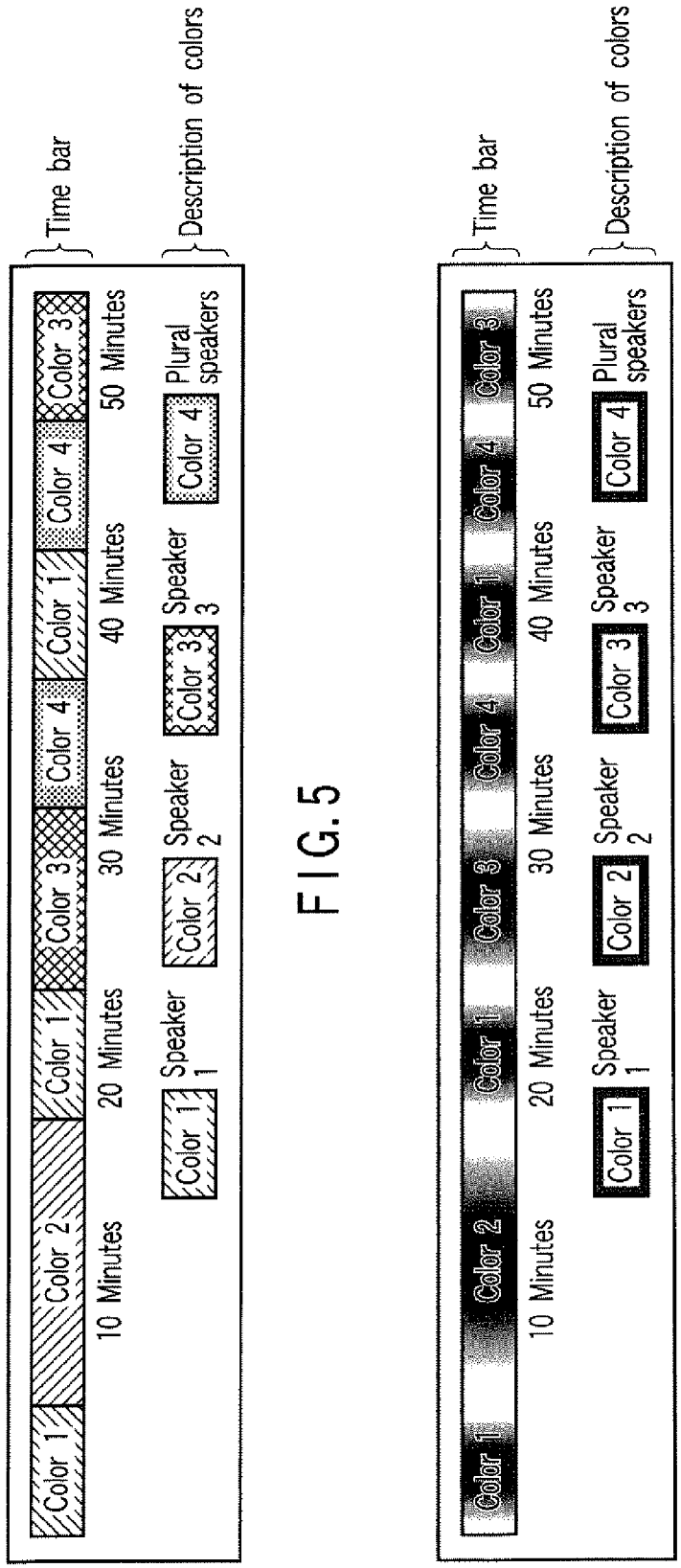
FIG. 5 shows a first example of an indexing view screen which is displayed on a display device by the electronic apparatus according to the embodiment.
FIG. 6 shows a second example of the indexing view screen which is displayed on the display device by the electronic apparatus according to the embodiment.

FIG. 5 shows a first example of the indexing view screen.

On the indexing view screen shown in FIG. 5, a time bar and a description area are displayed. A plurality of bar areas, which are indicative of positions of talk sections, are disposed on the time bar. These bar areas are colored in different colors in association with individual speakers.

Specifically, in FIG. 5, it is assumed that on the basis of an analysis result of sound characteristics, talk sections in video content data are classified into four groups (four talk section groups) corresponding to "speaker 1", "speaker 2", "speaker 3" and "speaker 4" ("plural speakers"), that is, four kinds of sound characteristics. The "speaker 4" is a talk section in which a conversion is held by plural speakers.

In the present embodiment, talk sections having the same sound characteristics are classified into the same talk section group, and the bar areas indicative of the talk sections belonging to the same talk section group are displayed in the same color. The bar area indicative of the position of each talk section belonging to the talk section group, which corresponds to the "speaker 1", is displayed in color 1 (e.g. red). The bar area indicative of the position of each talk section belonging to the talk section group, which corresponds to the "speaker 2", is displayed in color 2 (e.g. blue). The bar area indicative of the position of each talk section belonging to the talk section group, which corresponds to the "speaker 3", is displayed in color 3 (e.g. green). The bar area indicative of the position of each talk section belonging to the talk section group, which corresponds to the "plural speakers", is displayed in color 4 (e.g. yellow).

The description area is an area for displaying guide information for describing the correspondency between the color of each bar area (display mode of each bar area) and the speaker. This description area displays four color icons (a red icon, a blue icon, a green icon and a yellow icon), which are indicative of four color samples that are applied to the four talk section groups, and texts ("speaker 1", "speaker 2", "speaker 3", "plural speakers") for describing the correspondency between the respective colors and the respective speakers (talk section groups).

As described above, the bar areas on the time bar are displayed in different colors corresponding to the respective speakers (talk section groups). Thereby, for example, in a case where speech positions of a certain identical person are present at a plurality of positions in a broadcast program, it is possible to display, in the same color, the bar areas on the time bar, which are indicative of the positions at which the same person speaks. Therefore, the user can easily perform an operation of searching for speech positions of a specific person and playing back video content data at the respective speech positions.

Further, in the talk section detection process of the present embodiment, it is possible to detect not only the talk section in which an individual person speaks, but also the talk section in which a conversation is held by plural persons. The bar area, which is indicative of the position of the talk section in which a conversation is held by plural persons, is displayed in a color different from the color of the talk section in which an individual person speaks. Thereby, for example, a scene, such as a studio talk scene, in which a conversation is held by plural persons, and a scene, in which only a specific person speaks, can be displayed in different colors, and the program structure can visually be presented to the user by the time bar.

FIG. 5 shows, by way of example, the case in which a plurality of talk sections are successively present. In a case where an attribute section other than the talk section intervenes between adjacent talk sections, a gap is interposed between the bar areas corresponding to the adjacent talk sections, and this gap is displayed in a background color such as black, white or gray.

FIG. 6 shows a second example of the indexing view screen.

In the talk section detection process, there is a case in which it is difficult to clearly determine the position of a change of the speaker, for example, due to overlap of voices of plural persons. In the talk bar shown in FIG. 6, a gradation is imparted to the color of each bar area in such a manner that the color becomes gradually lighter from a position of clearest sound characteristics toward a position of less clear sound characteristics. Thereby, the time bar, which is visually easy to view, can be obtained.

The gradation display of the time bar shown in FIG. 6 can be executed, for example, by calculating, in units of a predetermined time of audio data, the degree of agreement between the sound characteristics of the audio data and the sound characteristic models corresponding to the plural speakers appearing in the video content data, and adjusting the density of the color that is applied to the bar area on the basis of the calculated degree of agreement.

For example, if attention is paid to a certain talk section, the gradation display of the bar area corresponding to this talk section is performed in the following manner.

To begin with, sound characteristics of each partial data are analyzed and classified. Thereby, sound characteristic models corresponding to the plural persons appearing in the video content data are generated. Then, the degree of agreement between the sound characteristics of the audio data in a certain talk section and the sound characteristic models corresponding to the plural speakers is calculated in units of a predetermined time. A position (time zone) in this talk section, where the degree of agreement with a certain sound characteristic sample exceeds a threshold, is detected. The density of the color, which is applied to the bar area corresponding to this talk section, is so adjusted that this detected position may be displayed in a color with the highest density and the density of the color becomes gradually lower at positions where the degree of agreement with the sound characteristic sample becomes gradually lower. A position, where the degree of agreement is below a predetermined lower limit value, is displayed in a background color such as black, white or gray.

By making use of the gradation display as shown in FIG. 6, it is possible to present to the user the correct position of the talk section by the time bar, even in the case where the position of the change of the speaker cannot clearly be determined.

Figure 7:
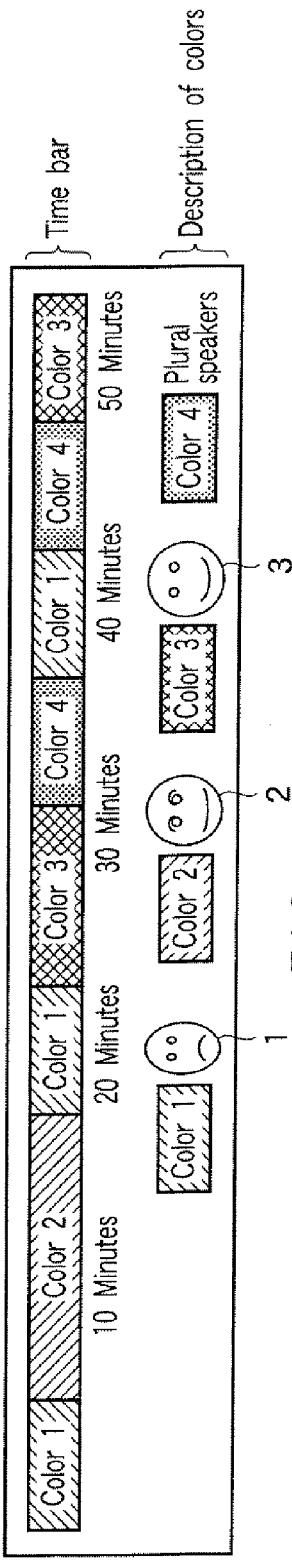
FIG. 7 shows a third example of the indexing view screen which is displayed on the display device by the electronic apparatus according to the embodiment.
Figure 8:
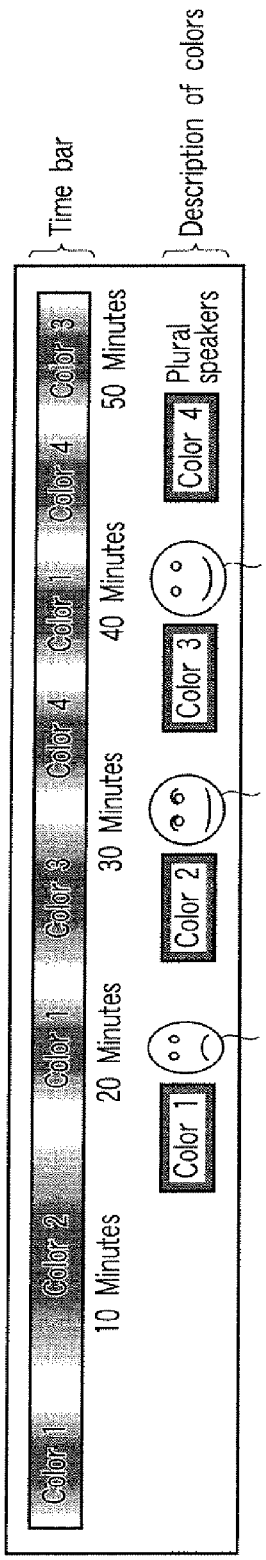
FIG. 8 shows a fourth example of the indexing view screen which is displayed on the display device by the electronic apparatus according to the embodiment.

FIG. 7 and FIG. 8 show a third example and a fourth example of the indexing view screen, respectively.

In the case where the bar areas on the time bar are simply displayed in different colors corresponding to the respective speakers (talk section groups), the user cannot identify the specific speakers, although the user can recognize a difference between the speakers. In FIG. 7 and FIG. 8, with respect to each talk section group, a face image appearing in the time zone corresponding to the talk section of the talk section group is specified, and the specified face image is displayed as a representative face image for identifying the speaker of the talk section group.

In each of the indexing view screens of FIG. 7 and FIG. 8, a face image 1 is the representative face image of the talk section group corresponding to the "speaker 1". A face image 2 is the representative face image of the talk section group corresponding to the "speaker 2". A face image 3 is the representative face image of the talk section group corresponding to the "speaker 3". The face images 1, 2 and 3 are used to indicate persons (speakers) corresponding to the bar areas on the time bar. The face images 1, 2 and 3 are displayed in the state in which the face images 1, 2 and 3 are associated with the color icons corresponding to the "speaker 1", "speaker 2" and "speaker 3" on the description area.

As the face image 1, use can be made of, for instance, a face image which commonly appears in a plurality of talk sections belonging to the talk section group corresponding to the "speaker 1". Needless to say, it is possible to specify three face images which appear in time zones corresponding to three talk sections belonging to the talk section group corresponding to the "speaker 1", and to display the three face images in an arranged fashions adjacent to the color icon corresponding to the color 1.

Figure 9:
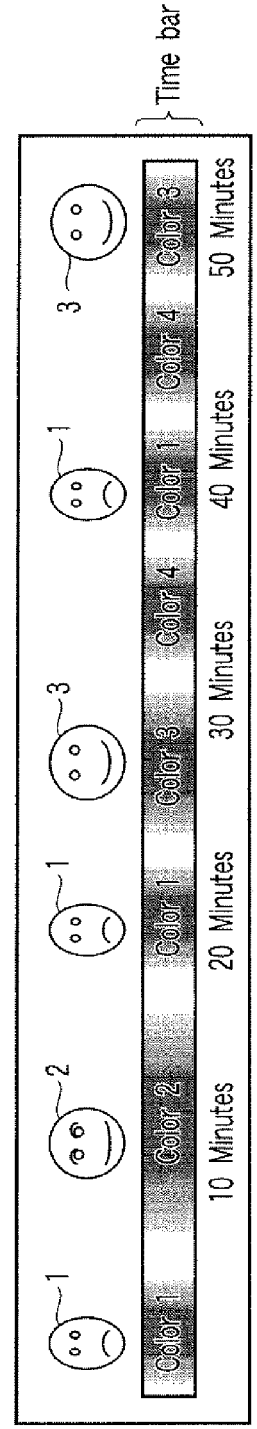
FIG. 9 shows a fifth example of the indexing view screen which is displayed on the display device by the electronic apparatus according to the embodiment.

FIG. 9 shows a fifth example of the indexing view screen. In the indexing view screen of FIG. 9, the face images 1, 2 and 3 are displayed, not on the description area, but in the state in which the face images 1, 2 and 3 are associated with the bar areas on the time bar. The face image 1 is displayed on the upper side of the bar areas of the three talk sections belonging to the talk section group corresponding to the "speaker 1". The face image 2 is displayed on the upper side of the bar area of the talk section belonging to the talk section group corresponding to the "speaker 2". The face image 3 is displayed on the upper side of the bar areas of the two talk sections belonging to the talk section group corresponding to the "speaker 3". Needless to say, with respect to all talk sections detected in the talk section detection process, the face images appearing in the time zones corresponding to these talk sections may be individually specified, and these face images may be displayed on the upper side of the bar areas of the talk sections on the time bar.

Figure 10:
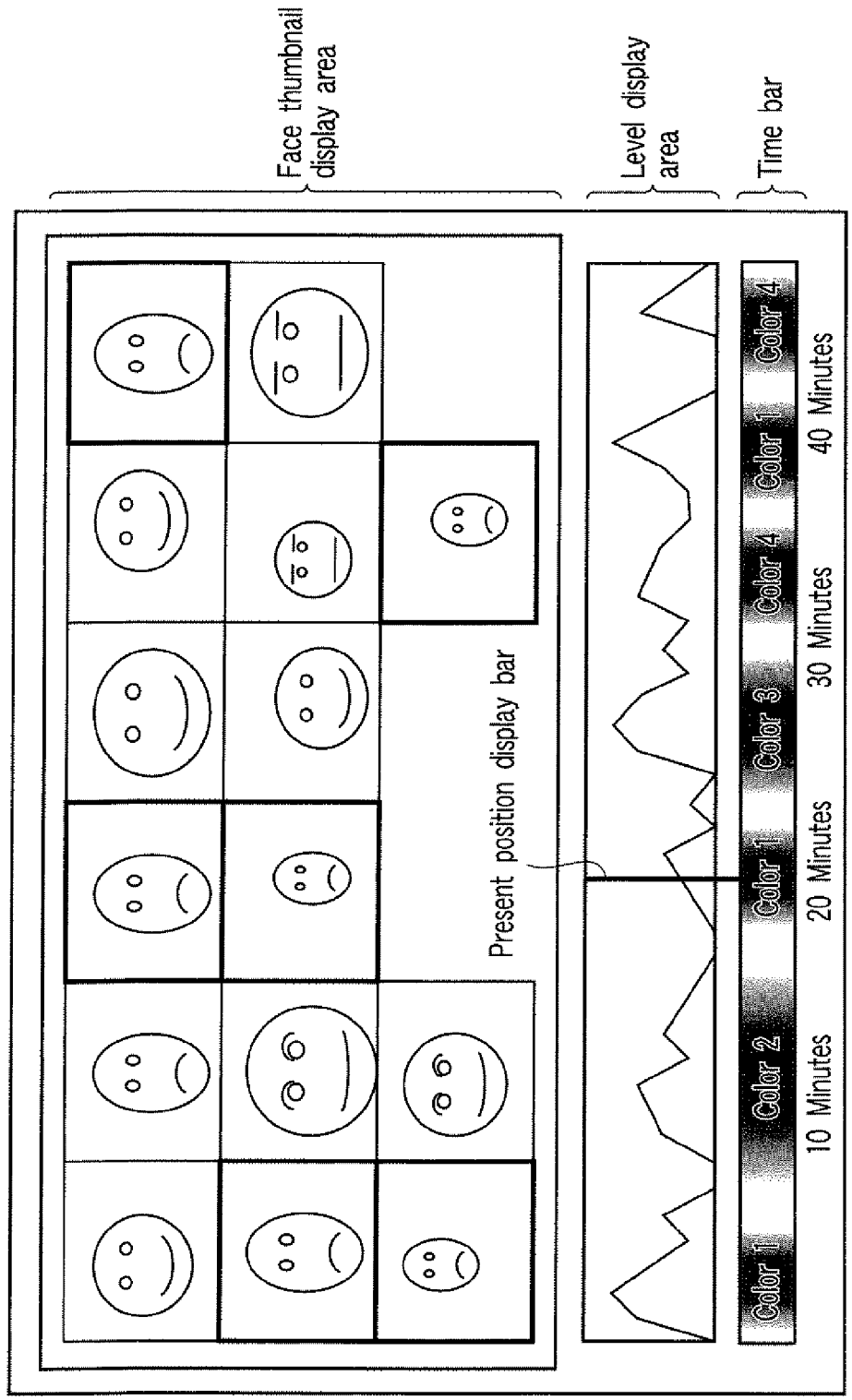
FIG. 10 shows a sixth example of the indexing view screen which is displayed on the display device by the electronic apparatus according to the embodiment.

FIG. 10 shows a sixth example of the indexing view screen.

This indexing view screen displays the face thumbnail display area, the level display area and the time bar. For example, in the case where a specific bar area on the time bar, for instance, a bar area corresponding to a certain talk section belonging to the talk section group of the color 1, is selected by, e.g. a movement operation of a present position display bar by the user, the face images of a person, who appears commonly in the talk sections belonging to the talk section group of the color 1, are detected. The detected face images of the person are displayed with emphasis in boxes.

Figure 11:
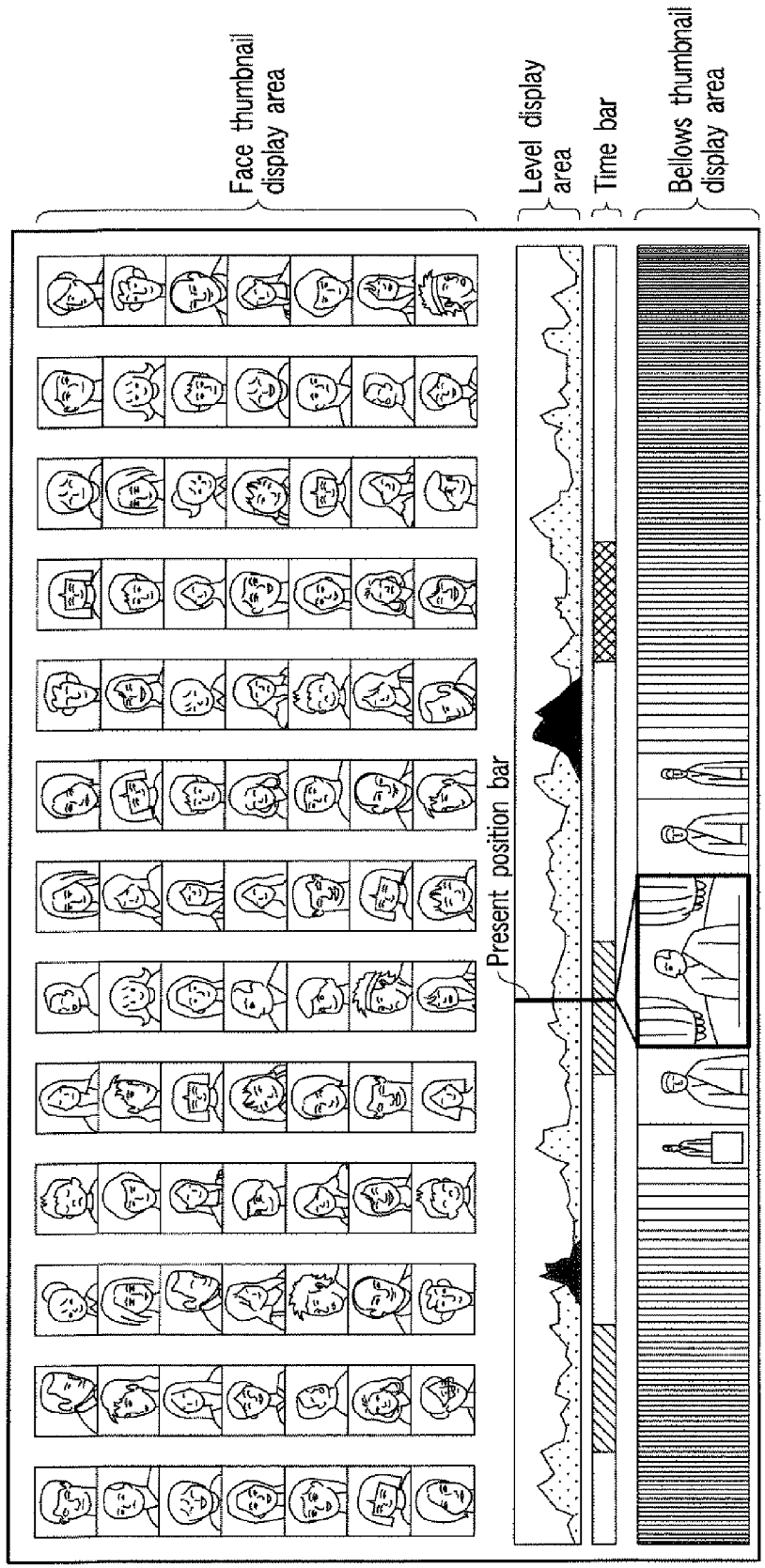
FIG. 11 shows a seventh example of the indexing view screen which is displayed on the display device by the electronic apparatus according to the embodiment.

FIG. 11 shows a seventh example of the indexing view screen.

The indexing view screen of FIG. 11 includes the above-described face thumbnail display area for displaying the list of face images, the above-described level display area, the above-described time bar, and the above-described bellows thumbnail display area for displaying the list of thumbnail images in a bellows format.

The term "bellows format", in this context, is a display format in which a selected thumbnail image is displayed in a normal size and other thumbnail images are displayed in laterally reduced sizes.

Specifically, the indexing information display process module 301 displays the thumbnail image, which is selected by the user operation, with a first lateral width size, and displays each of the other thumbnail images with a smaller lateral width size than the first lateral width size. In FIG. 11, a thumbnail image, which has a greater distance from the selected thumbnail image, is more reduced in its lateral size. In other words, the selected thumbnail image is displayed with a normal size, thumbnail images near the selected thumbnail image are displayed with reduced lateral widths, and the other thumbnail images are displayed with small lateral widths. A rectangular frame may be added to the selected thumbnail image.

One of thumbnail images on the bellows thumbnail display area can be selected by a user operation (a button of the remote-control unit, a cursor key, etc.).

The level display area displays a graph (a graph shown in a dense color in FIG. 11) indicating a variation of the cheer level, and a graph (a graph shown in a light color in FIG. 11) indicating a variation of the excitement level.

Figure 12:
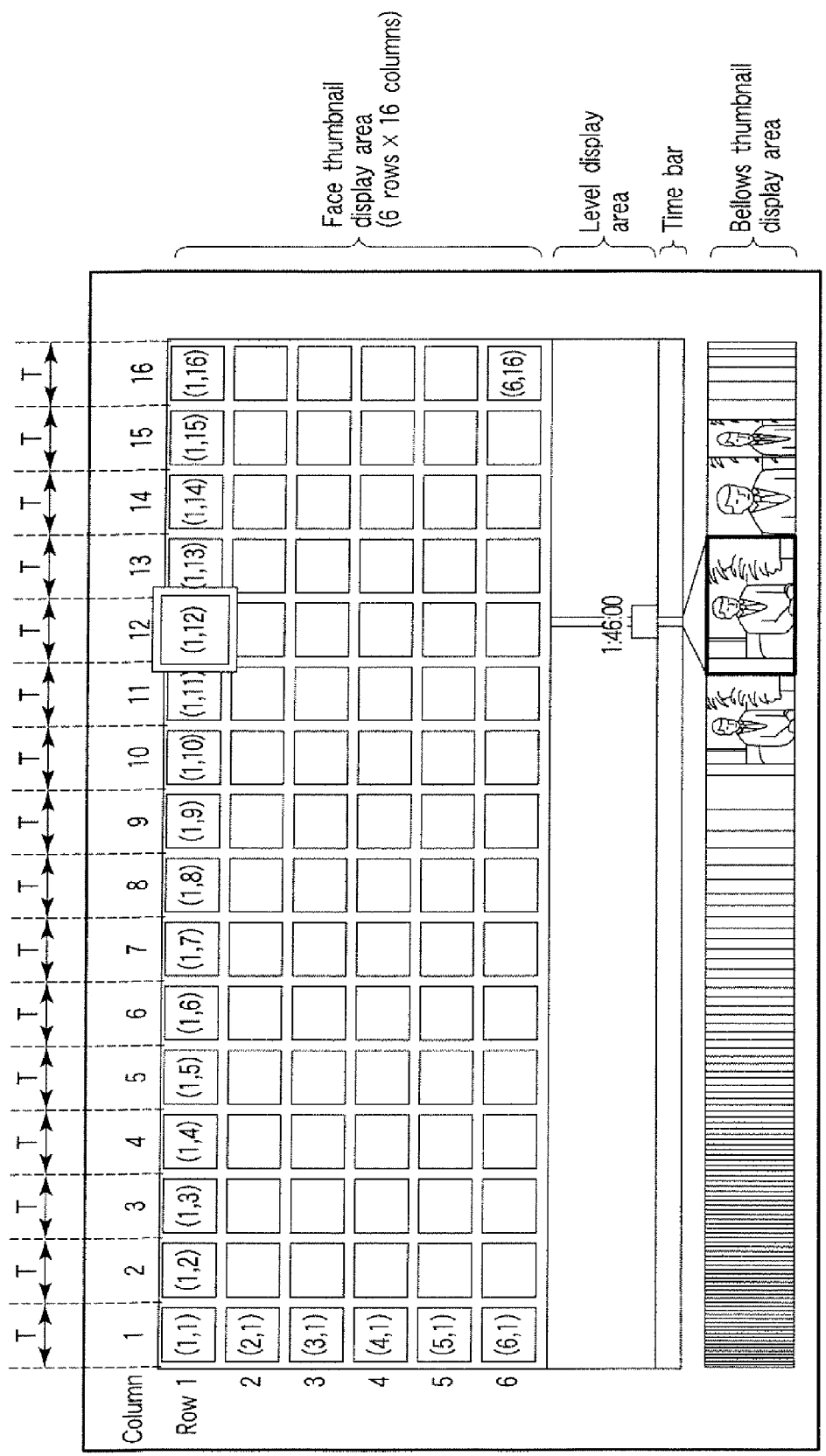
FIG. 12 shows the structure of a face thumbnail display area which is displayed on the indexing view screen shown in FIG. 11.

FIG. 12 shows a specific structure example of the face thumbnail display area which is displayed on the indexing view screen of FIG. 10 or FIG. 11.

The face thumbnail display area includes a plurality of face image display areas which are arranged in a matrix including a plurality of rows and a plurality of columns. In FIG. 12, the face thumbnail display area comprises 6 rows×16 columns. The number of face image display areas included in the face thumbnail display area is 96.

A plurality of time zones, each of which has the same time length T that is obtained by dividing the total time length of video content data (moving picture data included in video content data) by the number of columns (=16) at equal time intervals, are allocated to columns 1 to 16, respectively.

For example, if the total time length of video content data is two hours, the two hours are divided into 16 time zones at equal time intervals. In this case, the time length T of each time zone is 7.5 minutes. For example, a time zone from 0:00:00 (the beginning) to 0:07:30 is allocated to column 1, a time zone from 0:07:30 to 0:15:00 is allocated to column 2, and a time zone from 0:15:00 to 0:22:30 is allocated to column 3. The time length T of each time zone varies in accordance with the total time length of video content data.

Needless to say, the length of the time zone, which is allocated to each of the plural columns, may not necessarily be equal.

On the basis of time stamp information corresponding to face images which are extracted by the video processor 113, the indexing information display process module 301 displays the face images, which belong to the time zone allocated to each column, on the six face image display areas of the associated column by arranging the face images, for example, in the above-described order of frequency. In this case, the indexing information display process module 301 selects face images, the number of which is equal to the number of rows (six), from the face images that belong to the time zone allocated to the column that is the object of the display process, and arranges and displays the selected face images, the number of which is equal to the number of rows.

As has been described above, in the face thumbnail display area, use is made of a time axis having a base point at a left end position (1, 1) and an end point of video content data at a right end position (6, 16).

The user can select the size of the face image, which is displayed on each face image display area of the face thumbnail display area, from among "large", "medium" and "small". The number of rows and the number of columns are varied in accordance with the size of the face image which is selected by the user. The relationship between the size of the face image and the numbers of rows and columns is as follows.

(1) "large": 3 rows×8 columns
(2) "medium": 6 rows×16 columns
(3) "small": 10 rows×24 columns.

In the case of "large", each face image is displayed with a size of, e.g. 180×180 pixels. In the case of "medium", each face image is displayed with a size of, e.g. 90×90 pixels. In the case of "small", each face image is displayed with a size of, e.g. 60×60 pixels. The default face image size is set at, for example, "medium".

Each face image in the face thumbnail display area is set in one of two states, namely, a non selected "standard" state and a selected "focus" state. The size of the face image in the "focus" state is set to be greater than the size (180×180, 90×90, or 60×60) of the Face image in the "standard" state FIG. 12 shows the case in which the face image at coordinates (1, 12) is in the "focus" state.

The number of thumbnail images, which are displayed in the bellows thumbnail display area, is set at one of 240, 144, 96 and 48 in accordance with the user setting. The default value is, e.g. 240. In this case, moving picture data is divided into 240 sections (240 time zones), and 240 thumbnail images, which are extracted from the 240 sections, are arranged in the order of time and displayed on the bellows thumbnail display area.

The thumbnail image is set in one of two states, namely, a non-selected "standard" state and a selected "focus" state. The size of the thumbnail image in the "focus" state is set to be greater than the size of the other thumbnail images.

Figure 13:
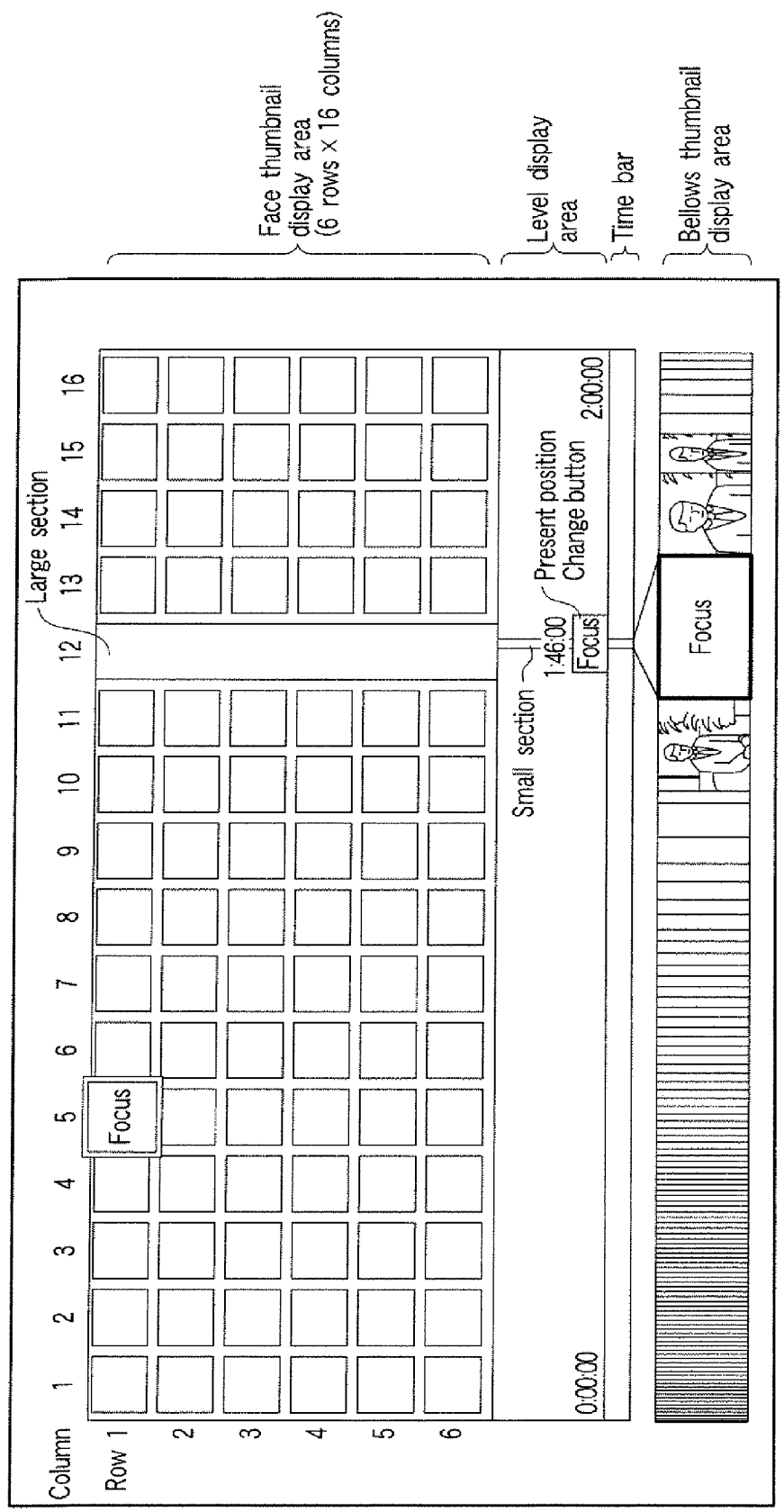
FIG. 13 is an exemplary view for explaining the relationship between the face thumbnail display area and a bellows thumbnail display area, which are displayed on the indexing view screen shown in FIG. 11.

Next, referring to FIG. 13, the relationship between the face thumbnail display area and the bellows thumbnail display area, which are displayed on the indexing view screen of FIG. 11, is described.

A set of face image display areas belonging to the same column, that is, each column in the face thumbnail display area, is referred to as "large section". Each of divisions of the "large section" is referred to as "small section". The number of small sections included in one large section is given by a quotient of the number of thumbnail images displayed in the bellows thumbnail display area, which are divided by the number of columns of the face thumbnail display area. For example, if the face thumbnail display area has a size of 6 rows×16 columns and the number of thumbnail images displayed in the bellows thumbnail display area is 240, the number of small sections included in one large section is 15 (=240÷16). One large section includes 15 small sections. In other words, 15 thumbnail images belong to the time zone corresponding to one large section.

When a certain thumbnail image on the bellows thumbnail display area is selected, the indexing information display process module 301 selects, on the basis of time stamp information of the selected thumbnail image, a column (large section) from plural columns (plural large sections) in the face thumbnail display area, to which the time zone to which the selected thumbnail image belongs is allocated. The selected large section is a large section which includes a section (small section) to which the selected thumbnail image belongs. The indexing information display process module 301 displays the selected large section with emphasis.

Further, the indexing information display process module 301 displays a present position bar (vertical bar) which connects the selected thumbnail image and the selected large section. The vertical bar is used in order to indicate to which of the 15 small sections, which are included in the selected large section, the small section corresponding to the selected thumbnail image corresponds. The vertical bar is displayed at the position of that small section of the 15 small sections included in the selected large section, which corresponds to the selected thumbnail image. For example, if the selected thumbnail image is the first image of the 15 thumbnail images belonging to the time zone corresponding to a certain large section, that is, the image corresponding to the first small section of the large section, the selected thumbnail image is connected to the left end of the large section by the vertical bar. On the other hand, for example, if the selected thumbnail image is the last image of the 15 thumbnail images belonging to the time zone corresponding to a certain large section, that is, the image corresponding to the last small section of the large section, the selected thumbnail image is connected to the right end of the large section by the vertical bar.

As has been described above, when a thumbnail image on the bellows thumbnail display area is selected, a column (large section), to which the time zone to which the selected thumbnail image belongs is allocated, is automatically selected from a plurality of columns in the face thumbnail display area. Thereby, the user can recognize to which of columns (large sections) in the face thumbnail display area the selected thumbnail image corresponds. Further, by the vertical bar, the user can also recognize to which time point in which column (large section) the selected thumbnail image corresponds.

Furthermore, the indexing information display process module 301 displays, on the basis of the time stamp information of the selected thumbnail image, the time information on the indexing view screen, which indicates the time point at which the selected thumbnail image appears.

A "present position change" button is an operation button for changing a thumbnail image which is selected. If the user operates a left cursor key or a right cursor key in the state in which the "present position change" button is focused, the thumbnail image to be selected is shifted to the left or right, for example, in units of one small section.

Figure 14:
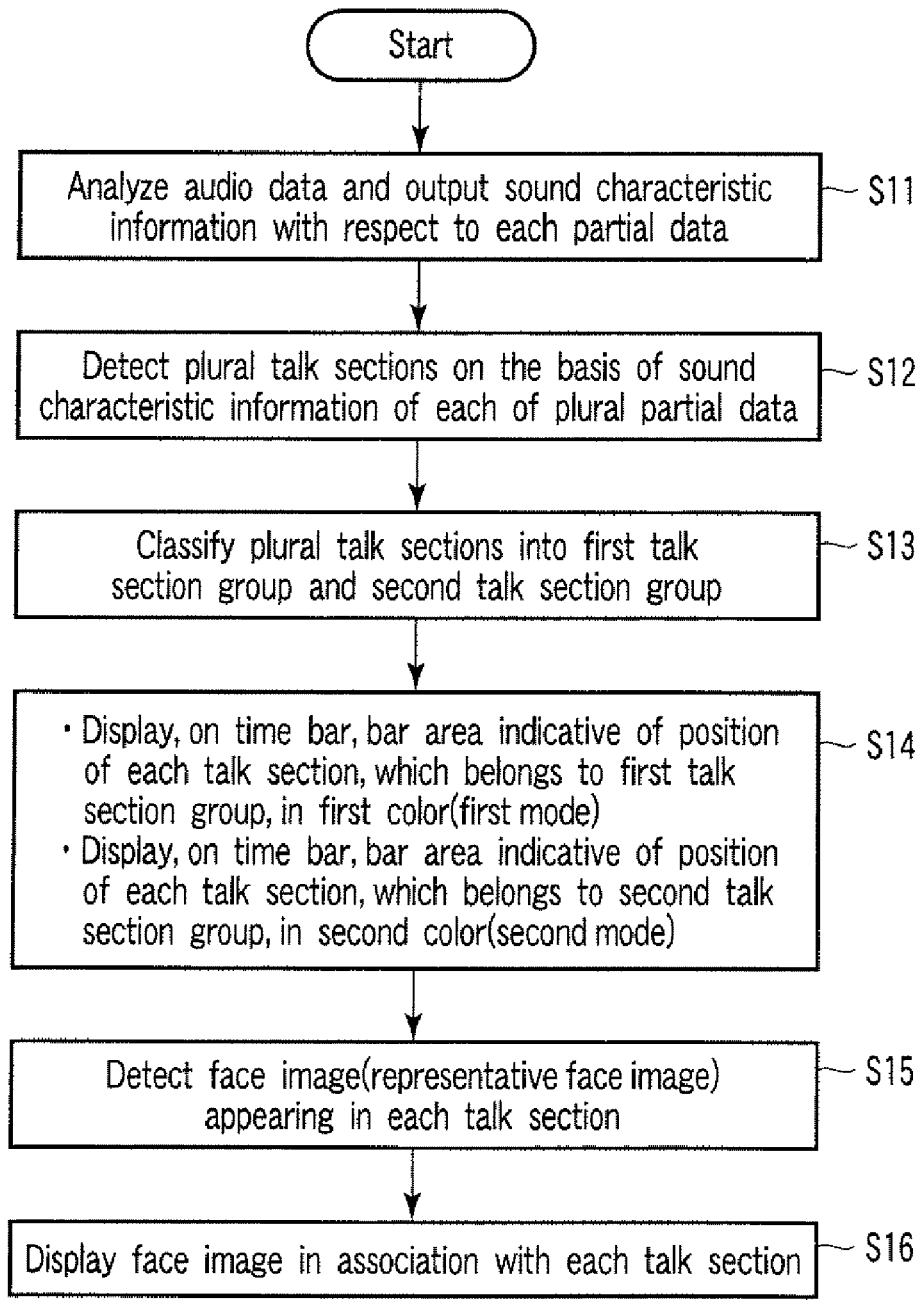
FIG. 14 is an exemplary flow chart illustrating the procedure of a time bar display process which is executed by the electronic apparatus according to the embodiment.

Next, referring to a flow chart of FIG. 14, a description is given of the process of displaying the time bar on the indexing view screen.

It is now assumed that speech positions of two speakers (speaker 1 and speaker 2) are present in video content data.

To start with, the video processor 113 analyzes audio data included in video content data, thereby extracting sound characteristics from each partial data of the audio data and outputting sound characteristic information indicative of the sound characteristics (step S11). Subsequently, the video processor 113 or indexing information display process module 301 executes a process of analyzing the sound characteristic information corresponding to each of plural partial data and detecting talk sections which are included in the video content data, and a process of classifying the talk sections into a first talk section group in which the speaker 1 is talking, and a second talk section group in which the speaker 2 is talking (step S12, S13).

In steps S12 and S13, for example, a process Ss executed of comparing sound characteristics of talk sections between the detected talk sections, and specifying the talk sections having the same sound characteristics. Thereby, the detected talk sections can be classified into the first talk section group and the second talk section group.

In addition, in steps S12 and S13, it is possible to classify sound characteristics relating to speeches on a speaker-by-speaker basis (speaker 1 and speaker 2), to generate sound characteristic models which are indicative of sound characteristics of the speaker 1 and speaker 2, to calculate the degree of agreement between the sound characteristics of the audio data and the sound characteristic models of the speakers 1 and 2 in units of a predetermined time, and to detect, from the audio data, talk sections having sound characteristics similar to the sound characteristic model of the speaker 1 and talk sections having sound characteristics similar to the sound characteristic model of the speaker 2.

Subsequently, the indexing information display process module 301 displays a bar area, which is indicative of the position of each talk section belonging to the first talk section group, on the time bar in a first color (first display mode), and a bar area, which is indicative of the position of each talk section belonging to the second talk section group, on the time bar in a second color (second display mode) (step S14).

Thereafter, on the basis of the time stamp information corresponding to each of the plural face images extracted from the video content data, the indexing information display process module 301 detects, from the plural face images, face images appearing in the talk sections belonging to the first talk section group and face images appearing in the talk sections belonging to the second talk section group (step S15). In step S15, the representative face image of the speaker of each talk section group is specified. For example, a face image of a person, who commonly appears in a plurality of talk sections belonging to a talk section group, can be specified as the representative face image of this talk section group.

Then, the indexing information display process module 30 displays the representative face images, which are specified with respect to the respective talk section groups, in association with the bar areas of the talk sections on the time bar or in association with the color icons on the description area (step S16).

As has been described above, in the present embodiment, talk sections are classified into a plurality of groups on a speaker-by-speaker basis, and the bar areas indicative of the positions of the talk sections are displayed on the time bar in different display modes in association with the respective groups. It is thus possible to present, to the user, in which time zones of the entire video content data the speech positions of a certain identical person appear, with the speech positions being classified on a person-by-person basis, without the need to play back the video content data. Therefore, simply by viewing the time bar, the user can search for a speech position of a specific person, can graphically recognize the structure of a program, and can easily execute seek to a position of content data in the program, which the user wishes to view.

The procedures of the indexing information display process of the present embodiment can all be realized by software. Therefore, by installing the software in an ordinary computer via a computer-readable memory medium, the same advantageous effects as in the present embodiment can easily be realized.

The electronic apparatus of the present embodiment can be realized by not only the computer 10, but also by various consumer electronic apparatuses such as an HDD recorder, a DVD recorder and a TV apparatus. In this case, the functions of the indexing information display process can be realized by hardware such as a DSP or a microcomputer.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
a talk section detection process module configured to execute a talk section detection process of detecting talk sections in which talks are made by persons, which are included in video content data, on the basis of audio data in the video content, and classifying the detected talk sections into a plurality of groups which are associated with different speakers; and
a display process module configured to display, on a time bar which is representative of a sequence of the video content data, a plurality of bar areas indicative of positions of the detected talk sections in the sequence of the video content data, in different colors in association with the groups, on the basis of a result of the talk section detection process,
wherein the talk section detection process includes a process of analyzing the audio data, thereby outputting sound characteristic information indicative of sound characteristics of the audio data, a process of generating, on the basis of the sound characteristic information, a plurality of sound characteristic models which are indicative of sound characteristics of speakers appearing in the video content data, and a process of calculating a degree of agreement between the sound characteristics of the audio data and the plurality of sound characteristic models in units of a predetermined time, and
the display process module is configured to detect, with respect to each of the talk sections, a position where the degree of agreement in the talk section exceeds a threshold, and to adjust a density of a color, which is applied to the bar area corresponding to the talk section in such a manner that the detected position is displayed in a color with a highest density and the density of the color becomes gradually lower at positions where the degree of agreement becomes gradually lower.

2. An electronic apparatus comprising:
a talk section detection process module configured to execute a talk section detection process of detecting talk sections in which talks are made by persons, which are included in video content data, on the basis of audio data in the video content, and classifying the detected talk sections into a plurality of groups which are associated with different speakers;
a display process module configured to display, on a time bar which is representative of a sequence of the video content data, a plurality of bar areas indicative of positions of the detected talk sections in the sequence of the video content data, in different display modes in association with the groups, on the basis of a result of the talk section detection process; and
a face image extraction module configured to extract a plurality of face images from the video content data, and to output time stamp information indicative of time points at which the plurality of extracted face images appear in the video content data,
wherein the display process module is configured to specify, with respect to each group, a face image appearing in a time zone corresponding to the talk section belonging to the group, on the basis of the time stamp information corresponding to the plurality of face images, and to display the specified face image as a representative face image for identifying the speaker of the group.

3. An electronic apparatus comprising:
a talk section detection process module configured to execute a talk section detection process of detecting talk sections in which talks are made by persons, which are included in video content data, on the basis of audio data in the video content, and classifying the detected talk sections into a plurality of groups which are associated with different speakers;
a display process module configured to display, on a time bar which is representative of a sequence of the video content data, a plurality of bar areas indicative of positions of the detected talk sections in the sequence of the video content data, in different display modes in association with the groups, on the basis of a result of the talk section detection process;
a face image extraction module configured to extract a plurality of face images from the video content data, and to output time stamp information indicative of time points at which the plurality of extracted face images appear in the video content data; and
a face image list display module configured to display a two-dimensional display area, on which the face images extracted by the face image extraction module are arranged, on one of an upper side and a lower side of the time bar,
wherein the two-dimensional display area includes a plurality of face image display areas which are arranged in a matrix including a plurality of rows and a plurality of columns, and a plurality of time zones, which constitute a total time length of the video content data, being allocated to the plurality of columns, respectively, the face image list display process module being configured to arrange the face images, which belong to the time zone allocated to each column, on the face image display areas of each column, on the basis of the time stamp information corresponding to the extracted face images.

4. A display process method for displaying an outline of video content data, comprising:
executing a talk section detection process of detecting talk sections in which talks are made by persons, which are included in the video content data, on the basis of audio data in the video content, and classifying the detected talk sections into a plurality of groups which are associated with different speakers; and
executing a display process of displaying, on a time bar which is representative of a sequence of the video content data, a plurality of bar areas indicative of positions of the detected talk sections in the sequence of the video content data, in different colors or different patterns in association with the groups, on the basis of a result of the talk section detection process,
wherein the talk section detection process includes a process of analyzing the audio data, thereby outputting sound characteristic information indicative of sound characteristics of the audio data, a process of generating, on the basis of the sound characteristic information, a plurality of sound characteristic models which are indicative of sound characteristics of speakers appearing in the video content data, and a process of calculating a degree of agreement between the sound characteristics of the audio data and the plurality of sound characteristic models in units of a predetermined time, and
said executing the display process includes displaying the plurality of bar areas in different colors in association with the groups, detecting, with respect to each of the talk sections, a position where the degree of agreement in the talk section exceeds a threshold, and adjusting a density of a color, which is applied to the bar area corresponding to the talk section, in such a manner that the detected position is displayed in a color with a highest density and the density of the color becomes gradually lower at positions where the degree of agreement becomes gradually lower.

5. A display process method for displaying an outline of video content data, comprising:
executing a talk section detection process of detecting talk sections in which talks are made by persons, which are included in the video content data, on the basis of audio data in the video content, and classifying the detected talk sections into a plurality of groups which are associated with different speakers;
executing a display process of displaying, on a time bar which is representative of a sequence of the video content data, a plurality of bar areas indicative of positions of the detected talk sections in the sequence of the video content data, in different colors or different patterns in association with the groups, on the basis of a result of the talk section detection process; and
extracting a plurality of face images from the video content data, and outputting time stamp information indicative of time points at which the plurality of extracted face images appear in the video content data,
wherein said executing the display process includes specifying, with respect to each group, a face image appearing in a time zone corresponding to the talk section belonging to the group, on the basis of the time stamp information corresponding to the plurality of face images, and displaying the specified face image as a representative face image for identifying the speaker of the group.

6. A display process method for displaying an outline of video content data, comprising:
executing a talk section detection process of detecting talk sections in which talks are made by persons, which are included in the video content data, on the basis of audio data in the video content, and classifying the detected talk sections into a plurality of groups which are associated with different speakers;
executing a display process of displaying, on a time bar which is representative of a sequence of the video content data, a plurality of bar areas indicative of positions of the detected talk sections in the sequence of the video content data, in different colors or different patterns in association with the groups, on the basis of a result of the talk section detection process;
extracting a plurality of face images from the video content data, and outputting time stamp information indicative of time points at which the plurality of extracted face images appear in the video content data; and
executing a face image list display process of displaying a two-dimensional display area is displayed, on which the face images extracted by said extracting the face images are arranged, on one of an upper side and a lower side of the time bar,
wherein the two-dimensional display area includes a plurality of face image display areas which are arranged in a matrix including a plurality of rows and a plurality of columns, and a plurality of time zones, which constitute a total time length of the video content data, being allocated to the plurality of columns, respectively, the face image list display process including arranging the face images, which belong to the time zone allocated to each column, on the face image display areas of each column, on the basis of the time stamp information corresponding to the extracted face images.

* * * * *